United States Patent
Yoo et al.

(10) Patent No.: US 11,549,858 B2
(45) Date of Patent: Jan. 10, 2023

(54) APPARATUS FOR TESTING AIRTIGHTNESS OF SEPARATOR FOR FUEL CELL

(71) Applicants: HYUNDAI MOTOR COMPANY, Seoul (KR); KIA MOTORS CORPORATION, Seoul (KR)

(72) Inventors: Jin Hyeok Yoo, Cheonan-si (KR); Byeong-Heon Jeong, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 73 days.

(21) Appl. No.: 17/144,828

(22) Filed: Jan. 8, 2021

(65) Prior Publication Data

US 2022/0057287 A1 Feb. 24, 2022

(30) Foreign Application Priority Data

Aug. 18, 2020 (KR) .......................... 10-2020-0103504

(51) Int. Cl.
*G01M 3/04* (2006.01)
*H01M 8/04664* (2016.01)

(52) U.S. Cl.
CPC ......... *G01M 3/04* (2013.01); *H01M 8/04664* (2013.01)

(58) Field of Classification Search
CPC ............ G01M 3/20; G01M 3/22; G01M 3/04; G01M 3/12; G01M 3/14
USPC .................................................. 73/40–49.8
See application file for complete search history.

(56) References Cited

U.S. PATENT DOCUMENTS

| | | | | |
|---|---|---|---|---|
| 704,267 A * | 7/1902 | Norton | ..................... | G01M 3/04 73/45.5 |
| 1,571,657 A * | 2/1926 | Wilkinson | .............. | G01M 3/00 73/46 |
| 2,982,125 A * | 5/1961 | Gilreath | .............. | G01M 3/2853 166/381 |
| 3,043,129 A * | 7/1962 | King | ........................ | G01M 3/04 73/40 |
| 3,254,526 A * | 6/1966 | Yarbrough | ........... | G01N 21/894 73/159 |

(Continued)

FOREIGN PATENT DOCUMENTS

| CN | 205038024 U | * | 2/2016 |
|---|---|---|---|
| KR | 10-1405580 | | 6/2014 |
| KR | 10-1405770 | | 6/2014 |

OTHER PUBLICATIONS

ESPACENET Machine Translation of CN 205038024 U Which Originally Published On Feb. 17, 2016. (Year: 2016).*

(Continued)

*Primary Examiner* — David A. Rogers
(74) *Attorney, Agent, or Firm* — Lempia Summerfield Katz LLC

(57) ABSTRACT

An apparatus for testing the airtightness of a separator for a fuel cell includes: a jig unit being in close contact with a surface of the separator on which an airtightness line is formed, and having a test flow field formed thereon, the test flow field being opened to a location contacting the airtightness line of the separator; and a test solution supply means for supplying a test solution to a contact location at which the airtightness line of the separator and the jig unit contact to each other through the test flow field of the jig unit, such that a leakage of the test solution at the contact location is tested.

7 Claims, 11 Drawing Sheets

(56) References Cited

U.S. PATENT DOCUMENTS

| | | | | | |
|---|---|---|---|---|---|
| 3,400,572 | A | * | 9/1968 | Mizenko | G01M 3/2869 73/37 |
| 3,438,435 | A | * | 4/1969 | Wennerberg | F28F 3/083 165/167 |
| 3,949,598 | A | * | 4/1976 | Bergstrand | G01M 3/3281 73/40.7 |
| 4,135,386 | A | * | 1/1979 | Peterson | G01N 19/08 73/104 |
| 4,202,201 | A | * | 5/1980 | Johnson | E06B 7/16 220/232 |
| 4,378,034 | A | * | 3/1983 | Albertson | F02B 77/04 141/1 |
| 4,494,403 | A | * | 1/1985 | Bowers | B01D 46/10 73/40.7 |
| 4,733,555 | A | * | 3/1988 | Franks | G01M 3/3218 73/49.3 |
| 4,745,797 | A | * | 5/1988 | Wegrzyn | G01M 3/20 73/40.7 |
| 4,765,810 | A | * | 8/1988 | Wetzel | B01D 46/42 96/417 |
| 4,791,806 | A | * | 12/1988 | Wade | G01M 3/205 73/40.7 |
| 4,901,558 | A | * | 2/1990 | Leining | G01M 3/363 73/49.3 |
| 4,979,390 | A | * | 12/1990 | Schupack | G01M 3/12 73/40 |
| 5,287,727 | A | * | 2/1994 | Nickerson, Jr. | G01M 3/02 73/49.8 |
| 5,373,729 | A | * | 12/1994 | Seigeot | G01M 3/227 73/49.3 |
| 5,375,453 | A | * | 12/1994 | Rudd | G01M 3/223 73/866 |
| 5,429,143 | A | * | 7/1995 | Marzluff | A61B 17/58 600/587 |
| 5,770,794 | A | * | 6/1998 | Davey | B64D 45/00 73/40 |
| 5,894,225 | A | * | 4/1999 | Coffin | G01R 31/2887 324/763.01 |
| 5,913,238 | A | * | 6/1999 | Lanham | B65D 5/067 73/49.3 |
| 6,450,009 | B1 | * | 9/2002 | Hartikainen | G01N 15/0826 73/38 |
| 6,595,039 | B2 | * | 7/2003 | Brass | B05D 7/22 73/40.7 |
| 6,715,365 | B2 | * | 4/2004 | Davey | G01N 19/08 73/799 |
| 6,794,078 | B1 | * | 9/2004 | Tashiro | H01M 8/0226 524/495 |
| 7,748,259 | B2 | * | 7/2010 | Faidi | H01M 8/04664 73/104 |
| 7,849,730 | B2 | * | 12/2010 | Yung | G01M 3/2869 73/49.8 |
| 9,128,002 | B2 | * | 9/2015 | Marino | G01M 3/3254 |
| 9,829,259 | B2 | * | 11/2017 | Nyander | F28D 9/005 |
| 10,309,862 | B2 | * | 6/2019 | Decker | G01M 3/3218 |
| 10,914,652 | B2 | * | 2/2021 | Olsson | F28F 3/042 |
| 11,251,448 | B2 | * | 2/2022 | Formanski | H01M 8/04082 |
| 2002/0002866 | A1 | * | 1/2002 | Davey | G01N 19/08 73/788 |
| 2002/0112527 | A1 | * | 8/2002 | Nadin | B64F 5/60 73/40 |
| 2004/0013932 | A1 | * | 1/2004 | Miyazawa | H01M 8/0267 429/457 |
| 2009/0025456 | A1 | * | 1/2009 | Muller | G01M 3/229 73/1.06 |
| 2010/0262078 | A1 | * | 10/2010 | Blomquist | A61M 5/16831 73/40 |
| 2014/0013828 | A1 | * | 1/2014 | Kiest, Jr. | G01M 3/223 73/40.7 |
| 2016/0018282 | A1 | * | 1/2016 | Kimyae | F17D 5/02 73/40 |
| 2018/0067013 | A1 | * | 3/2018 | Son | G01M 3/20 |

OTHER PUBLICATIONS

Rick Barnes, "Locating Fine Leaks in High Vacuum Apparatus", IBM Technical Disclosure Bulletin vol. 37 No. 04A, Apr. 1994. (Year: 1994).*

* cited by examiner

APPARATUS FOR TESTING AIRTIGHTNESS OF SEPARATOR FOR FUEL CELL

CROSS REFERENCE TO RELATED APPLICATION

This application claims priority to and the benefit of Korean Patent Application No. 10-2020-0103504, filed on Aug. 18, 2020, the entire contents of which are incorporated herein by reference.

FIELD

The present disclosure relates to an apparatus for testing airtightness of a separator for a fuel cell.

BACKGROUND

The statements in this section merely provide background information related to the present disclosure and may not constitute prior art.

A fuel cell, as a kind of a power generator for electrochemically reacting chemical energy owned by fuel within a stack to convert the chemical energy into electric energy, may be used for supplying power to a compact electronic product such as a mobile device as well as supplying driving powers for industrial, household, and vehicle, and in recent years, the use area of the fuel cell is gradually expanding as a highly efficient clean energy source.

FIG. 1 is a diagram illustrating a configuration of a general fuel cell stack.

As illustrated in FIG. 1, each unit cell configuring the fuel cell stack is located with a membrane-electrode assembly (MEA) at the innermost portion, and the membrane-electrode assembly 10 is composed of a polymer electrolyte membrane 11 which may move a proton of hydrogen, and a catalyst layer, that is, an anode 12 and a cathode 13 applied on both surfaces of the electrolyte membrane such that hydrogen and oxygen may react.

In addition, an outer portion of the membrane-electrode assembly 10, that is, an outer portion on which the anode 12 and the cathode 13 are located is laminated with a pair of gas diffusion layers (GDLs) 20, the outer portion of the gas diffusion layer 20 is located with a pair of separators 30 having a flow field formed thereon with a gasket 40 interposed therebetween so as to supply coolant together with hydrogen which is fuel and air and discharge the water generated by the reaction, and the outermost portion of the membrane-electrode assembly 10 is coupled to an end plate 50 for supporting and fixing the respective components.

In addition, the fuel cell stack is formed by laminating a number of unit cells.

Meanwhile, if hydrogen and air are leaked from the fuel cell stack, the electricity generation efficiency of the fuel cell stack is greatly decreased, and since the hydrogen is combustible gas, the risk of fire and explosion exists.

Therefore, the airtightness of the unit cell configuring the fuel cell stack is a very important factor, and to this end, a technology of integrating the gasket 40 into the separator 30 by injection molding is also applied.

Meanwhile, FIG. 2 is a diagram illustrating an airtightness line formed on a separator configuring a general unit cell.

As illustrated in FIG. 2, the separator is formed with a reaction surface portion 30a facing the anode 12 and the cathode 13 through which hydrogen and air flow, an inflow manifold portion 30b for introducing each of hydrogen, air, and coolant into the reaction surface portion 30a, and a discharge manifold portion 30c for discharging each of the hydrogen, the air, and the coolant from the reaction surface portion 30a.

At this time, the airtightness of the reaction surface portion 30a, the inflow manifold portion 30b, and the discharge manifold portion 30c is maintained by the airtightness line formed by the gasket 40, respectively.

At this time, the airtightness line formed by the gasket 40 may be classified into an external airtightness line 41 formed along the edge of the separator 30 and visually confirmed from the outside, and an internal airtightness line 42 formed along the edges of the inflow manifold portion 30b and the discharge manifold portion 30c and not visually confirmed from the inside.

Meanwhile, conventionally, the fuel cell stack is manufactured by laminating a number of unit cells, and then the airtightness test of the external airtightness line 41 and the internal airtightness line 42 is performed using an inert gas such as helium.

However, in such a method, we have discovered that even though it is possible to determine whether the airtightness is leaked, it is very difficult to track the leakage location.

Particularly, in the case of the internal airtightness line not exposed to the outside, since it is difficult to confirm the leakage point, there is a problem in that it is difficult to draw out the improvement.

In addition, we have found that the quality of the component of each unit cell is degraded in a process of disassembling and re-fastening the fuel cell stack.

The foregoing explained as the background is intended merely to aid in the understanding of the background of the present disclosure, and is not intended to mean that the present disclosure falls within the purview of the related art that is already known to those skilled in the art.

SUMMARY

The present disclosure provides an apparatus for testing the airtightness of a separator for a fuel cell, which may test a state of an airtightness line formed on the separator before a stack is laminated.

Particularly, the present disclosure provides an apparatus for testing the airtightness of a separator for the fuel cell, which may confirm a leakage point together with whether an airtightness lines formed on a separator is leaked.

In one form of the present disclosure, an apparatus for testing the airtightness of a separator for a fuel cell includes: a jig unit being in close contact with a surface of the separator on which an airtightness line is formed, and having a test flow field formed thereon, the test flow field being opened to a location contacting the airtightness line of the separator; and a test solution supply means for supplying a test solution to a contact location at which the airtightness line of the separator and the jig unit contact to each other through the test flow field of the jig unit, such that a leakage of the test solution at the contact location is tested.

In one form, the jig unit includes: a lower jig having the test flow field formed thereon, wherein the separator is seated on an upper surface of the lower jig; and an upper jig disposed on and pressing the separator to bring the separator into a close contact with the lower jig.

In another form, the test flow field is split by a predetermined length along the airtightness line of the separator into a plurality of test flow field sections, and the test solution independently flows to each test flow field section of the plurality of test flow field sections by the test solution supply means.

The test flow field of the lower jig is filled with the test solution having a predetermined volume, and the test solution supply means presses the test solution in an opening direction of the test flow field.

In other form, the jig unit includes: a lower jig having an upper surface on which the separator is seated; and an upper jig disposed on and pressing the separator so as to bring form a close contact between the separator and the lower jig. In particular, the test flow field is formed on a lower surface of the upper jig, and the test flow field is opened to the contact location.

The test solution supply means includes: a cylinder installed to fluidly communicate with the test flow field and filled with the test solution having a predetermined volume; and a piston provided inside the cylinder to reciprocate, to press the test solution in the opening direction of the test flow field by a forward motion, and to recover the test solution into the cylinder by a backward motion.

The jig unit is made of a transparent material, and the test solution is a color liquid.

In one form, the apparatus for testing the airtightness of the separator further includes: a chamber for providing a test space; a press lower plate disposed on a bottom surface of the chamber, wherein a first surface of the jig unit is seated on the press lower plate; a press upper plate disposed on the jig unit and pressing a second surface of the jig unit; and a press movable shaft coupled to an upper portion of the press upper plate to press and move the press upper plate toward the press lower plate. In another form, the press lower plate, the jig unit and the press upper plate are arranged in the test space.

The exemplary form of the present disclosure may specifically confirm failure of the airtightness line of the unit cell configuring the fuel cell stack before the stack is laminated, and easily confirm the location thereof.

Therefore, it is possible to inspect the quality at a single product level before the fuel cell stack is fastened, thereby preventing the degradation of the quality of the component of the unit cell caused by disassembling and re-fastening the stack compared to the conventional method for verifying the airtightness after the stack is fastened.

In addition, since a solution such as a 'bubble solution for checking leakage' is conventionally used upon the occurrence of failure of the airtightness after the stack is fastened, the unit cell is inevitably contaminated, but the present disclosure may fundamentally prevent the contamination of the unit cell.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
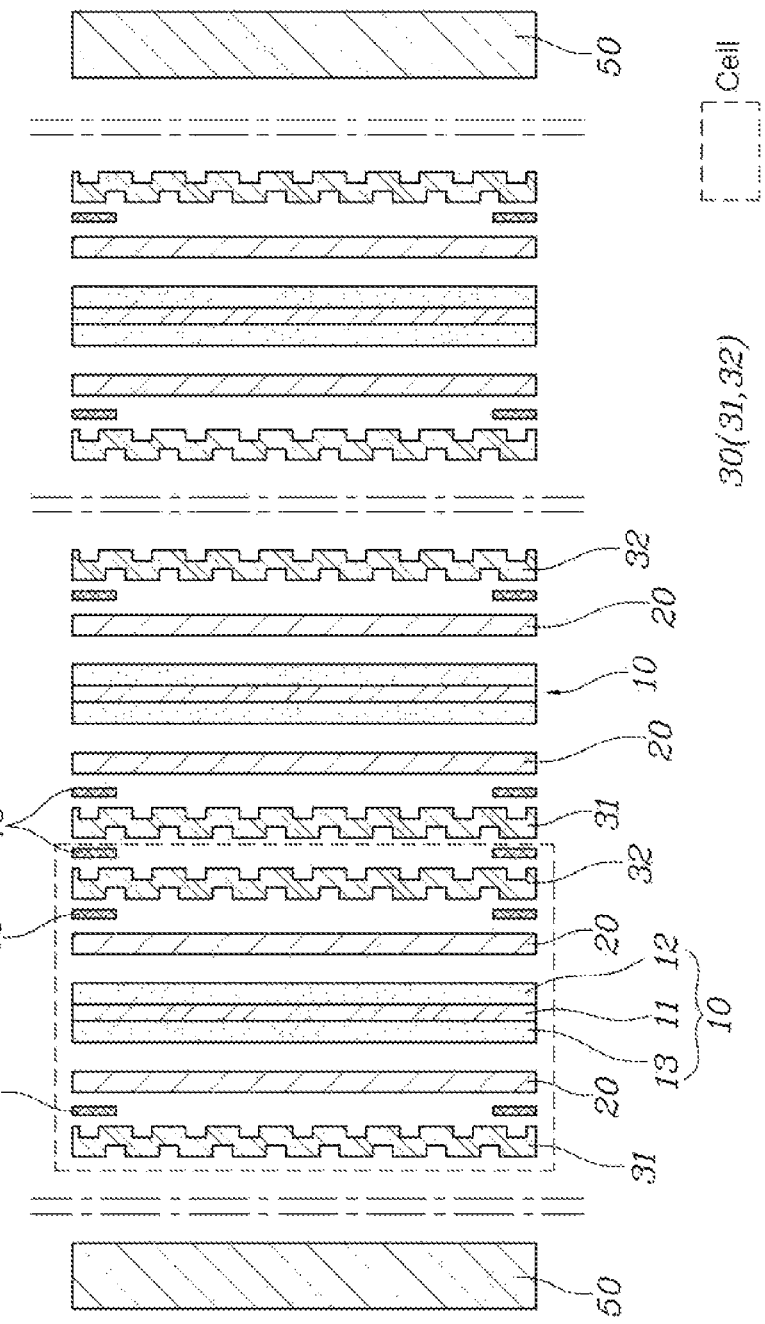
FIG. 1 is a diagram illustrating a configuration of a general fuel cell stack.
Figure 2:
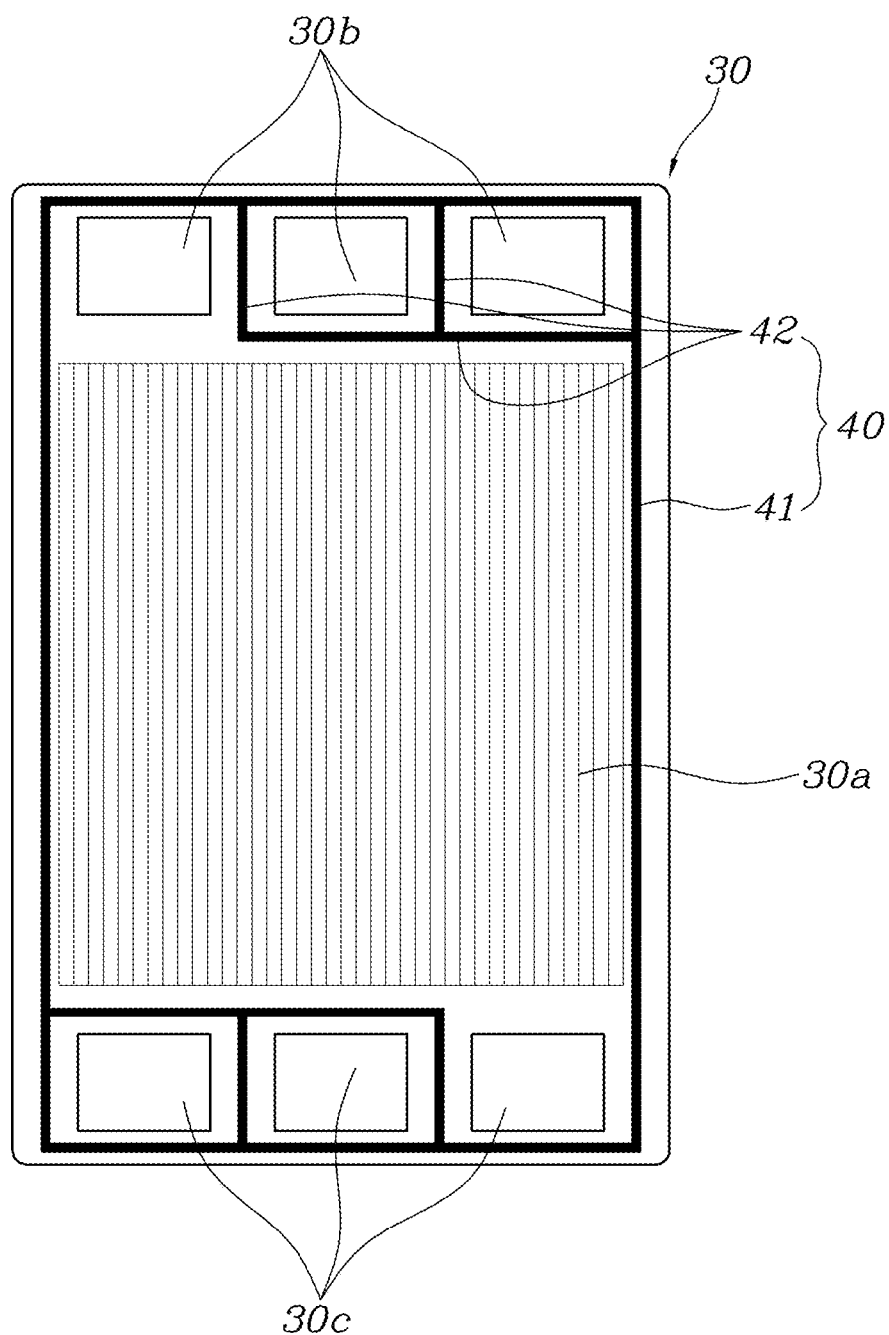
FIG. 2 is a diagram illustrating an airtightness line formed on a separator configuring a general unit cell.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in more detail with reference to the accompanying drawings. However, the present disclosure is not limited to the exemplary forms disclosed below but will be implemented in various different forms, and the present exemplary forms are provided to complete the disclosure of the present disclosure and to completely inform those skilled in the art of the scope of the present disclosure.

Figure 3:
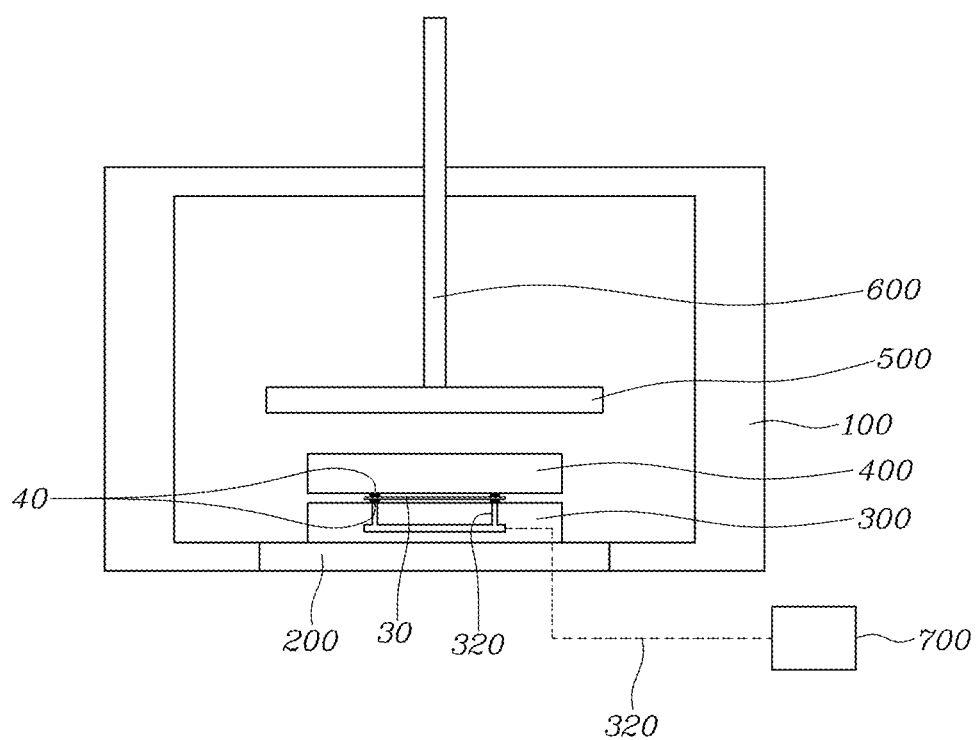
FIG. 3 is a diagram illustrating an apparatus for testing the airtightness of a separator for the fuel cell according to an exemplary form of the present disclosure.
Figure 4:
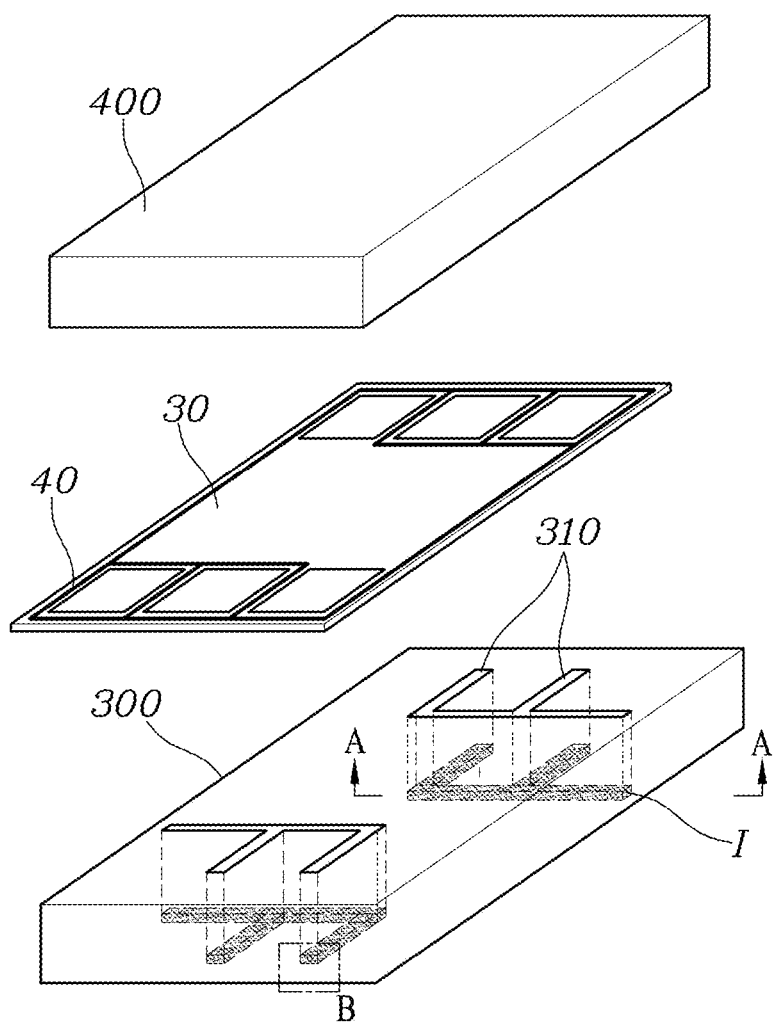
FIG. 4 is a perspective diagram illustrating main parts of the apparatus for testing the airtightness of the separator for the fuel cell according to the exemplary form of the present disclosure.
Figure 5:
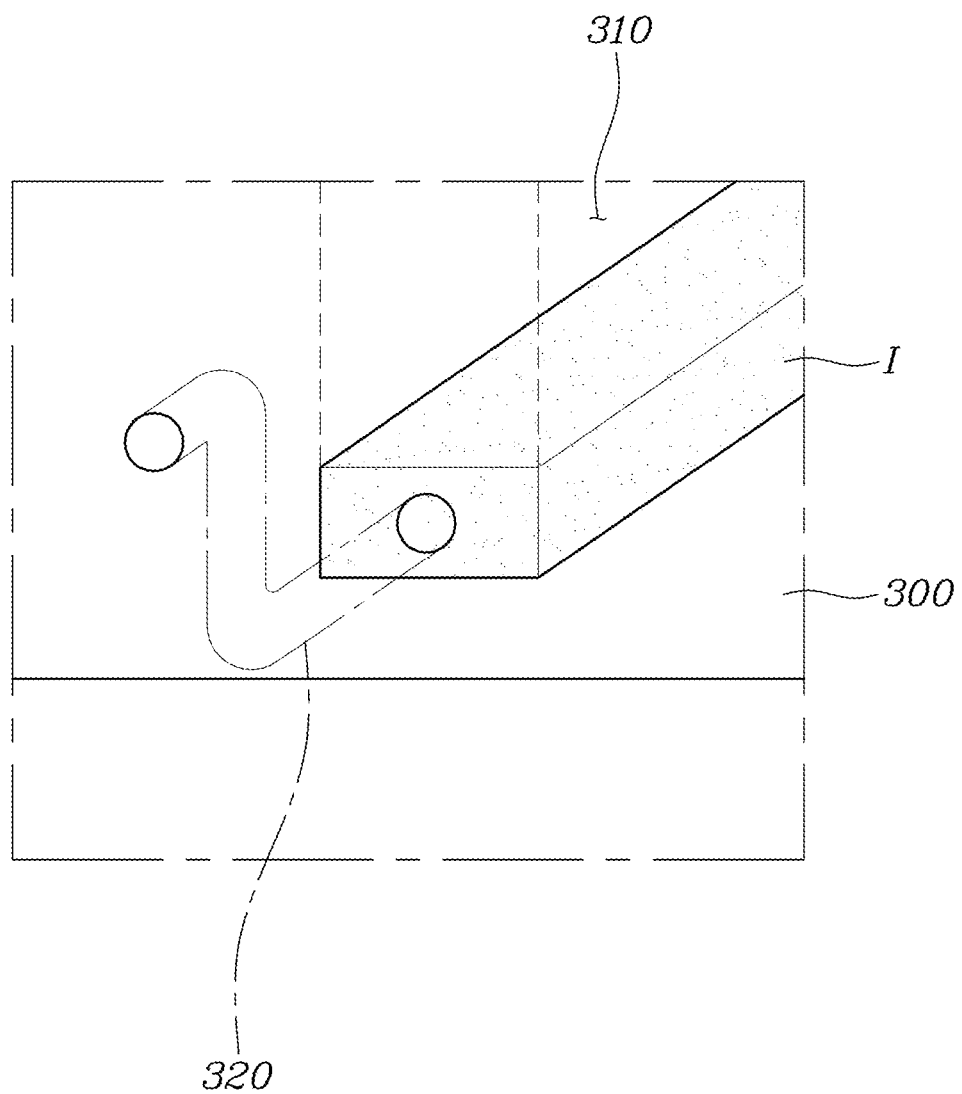
FIG. 5 is a perspective diagram illustrating main parts of a lower jig in one form of the present disclosure.

FIG. 3 is a diagram illustrating an apparatus for testing the airtightness of a separator for the fuel cell according to an exemplary form of the present disclosure, FIG. 4 is a perspective diagram illustrating main parts of the apparatus for testing the airtightness of the separator for the fuel cell according to the exemplary form of the present disclosure, and FIG. 5 is a perspective diagram illustrating main parts of a lower jig according to the exemplary form of the present disclosure. At this time, FIG. 5 is a perspective diagram enlarging main parts of an area B illustrated in FIG. 4.

As illustrated in FIG. 3, the apparatus for testing the airtightness of a separator for the fuel cell is an apparatus for testing an airtightness line formed on a separator 30 configuring a unit cell of the fuel cell by a gasket 40, and includes jig unit 300, 400 which are in close contact with a surface on which the airtightness line 40 of the separator 30 is formed, and have a test flow field 310, which is opened to a location contacting the airtightness line 40 of the separator 30, formed thereon; and a test solution supply means 700 for supplying a test solution to the locations at which the airtightness line 40 of the separator 30 and the jig unit 300, 400 contact each other through the test flow field of the jig unit 300, 400.

Therefore, the apparatus tests whether the test solution I is leaked at the contacting portion between the airtightness line 40 of the separator 30 and the jig unit 300, 400.

The jig unit 300, 400 are units which are in close contact with the gasket 40 (hereinafter, referred to as 'airtightness line') formed on the separator, and supplies the test solution I to the location contacting the airtightness line 40 through the test flow field 310, and provided to test a state of the airtightness line 40 formed on the lower surface of the separator 30.

In one form, the jig unit 300, 400 includes a lower jig 300 having the separator 30 seated on the upper surface thereof, the separator 30 having the airtightness line 40 formed; and an upper jig 400 disposed on the lower jig 300 and pressing the separator 30 to bring the separator 30 into close contact with the lower jig 300.

At this time, the lower jig 300 is formed with the test flow field 310 opened to the location contacting the airtightness line 40 of the separator 30.

The present exemplary form forms the test flow field 310 opened to the location contacting the internal airtightness line 42 in order to test the internal airtightness line 40 among the airtightness lines 40 of the separator 30. However, the location at which the test flow field 310 is formed is not limited thereto, and the test flow field 310 opened to the location contacting the entire airtightness line 40 of the separator 30 may be formed or the test flow field 310 opened to the location contacting the external airtightness line 41 of the airtightness line 40 may be formed.

Meanwhile, the test flow field 310 formed on the lower jig 300 is opened to the upper surface of the lower jig 300 in order to test the airtightness line 40 formed on the lower surface of the separator 30.

In one form, the lower jig 300 is made of a transparent material to identify the test solution I filled in the test flow field 310. For example, the lower jig 300 may be made of a transparent material such as acrylic or tempered glass.

In another form, the test solution I is made of a color solution to be easily and visually identified. For example, the test solution I may be implemented by a color ink.

The test solution supply means 700 is a means for supplying the test solution to a location at which the airtightness line 40 of the separator 30 and the jig unit 300, 400 contact each other through the test flow field 310 of the jig unit 300, 400.

In the present exemplary form, the test solution having a predetermined volume is filled in the test flow field 310. Therefore, the test solution I is in a state of being filled in the lower area of the test flow field 310 by gravity. Therefore, the test solution supply means 700 is implemented by a means for pressing and moving the test solution I filled in the lower area of the test flow field 310 in an opening direction of the upper area thereof.

For example, as illustrated in FIGS. 3 and 5, the lower jig 300 is formed with a connection flow field 320 for supplying an inert gas to the test flow field 310. In addition, a pump is provided as the test solution supply means 700 and connected to the connection flow field 320. Therefore, the compressed inert gas is provided to the test flow field 310 through the connection flow field 320 by an operation of the pump, and the thus provided inert gas pushes the test solution I filled in the test flow field 310 to the opening of the test flow field 310.

At this time, the connection flow field 320 is formed at a location higher than the level of the test solution I filled in the test flow field 310 such that the test solution I filled in the test flow field 310 is not discharged to the outside through the connection flow field 320. In addition, the connection flow field 321 may extend into the lower jig 300 and be connected to the test flow field 310.

Meanwhile, the apparatus for testing the airtightness of the separator for the fuel cell according to the exemplary form of the present disclosure further includes a chamber 100 for providing a test space therein for an operation of the aforementioned jig unit 300, 400; a press lower plate 200 disposed on the bottom surface of the chamber 100 and having one surface of the jig unit (i.e., the lower jig 300) seated thereon; a press upper plate 500 disposed on the jig unit 300, 400 inside the chamber 100 to press the other surface of the jig unit 300, 400, that is, the upper jig 400; and a press movable shaft 600 coupled to the upper portion of the press upper plate 500 to press and move the press upper plate 500 toward the press lower plate 200.

A use state of the apparatus for testing the airtightness of the separator for the fuel cell according to the exemplary form of the present disclosure configured as described above will be described with reference to the drawings.

Figure 6:
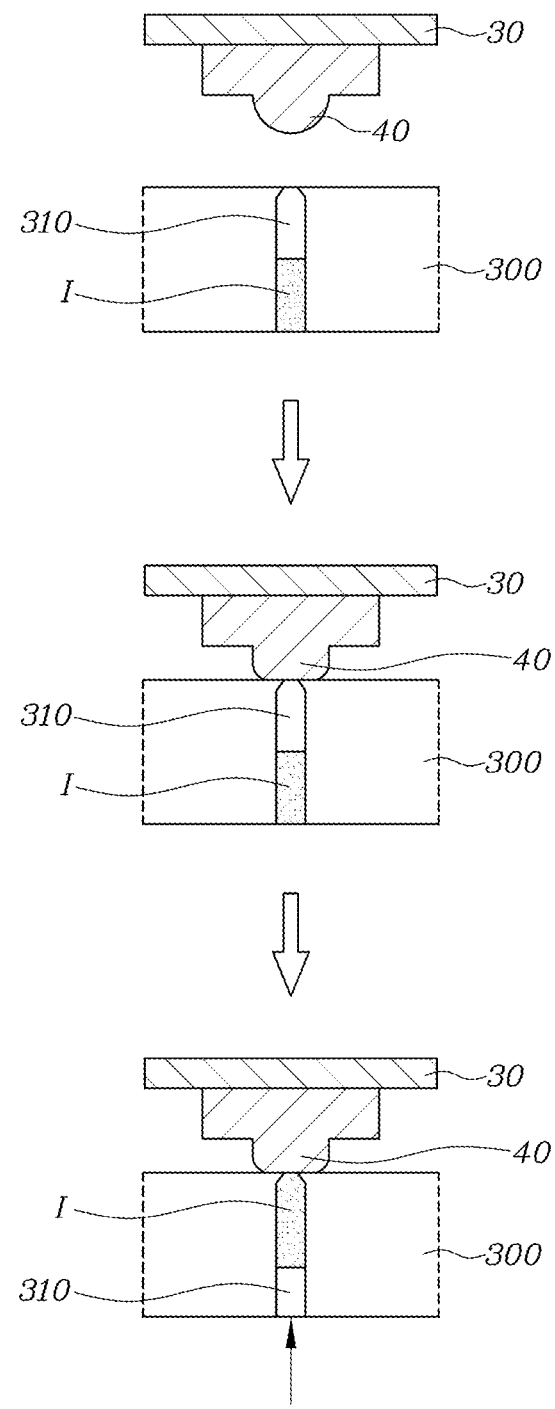
FIGS. 6 to 8 are diagrams illustrating a use state of the apparatus for testing the airtightness of the separator for the fuel cell according to an exemplary form of the present disclosure.
Figure 7:
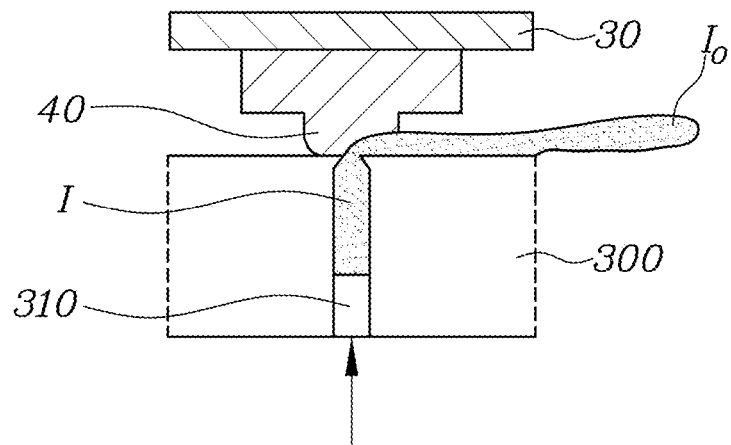
Figure 8:
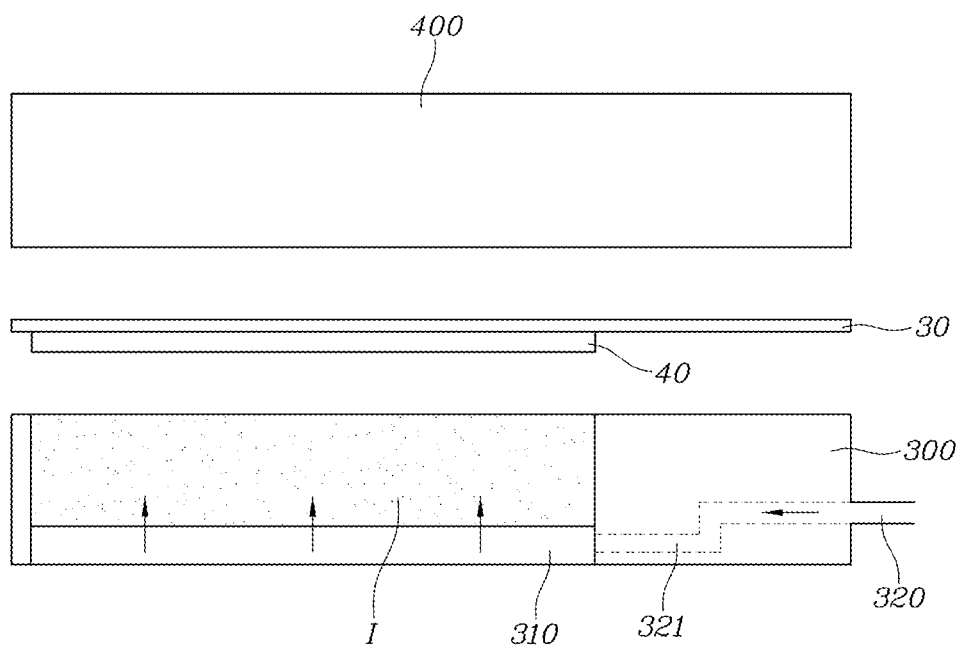

FIGS. 6 to 8 are diagrams illustrating use states of the apparatus for testing the airtightness of the separator for the fuel cell according to the exemplary form of the present disclosure.

For testing the airtightness line 40 formed on the separator 30, first, as illustrated in FIG. 3, the lower jig 300 is placed on the press lower plate 200, and the separator 30 is seated on the upper surface of the lower jig 300. In addition, the upper portion of the lower jig 300 is covered by the upper jig 400.

In addition, the press movable shaft 600 is moved downward to press the press upper plate 500 toward the press lower plate 200. Therefore, the separator 30 is in close contact with the lower jig 300. Then, the airtightness line 40 formed under the separator 30 is in a state of closing the opening of the test flow field 310 formed on the lower jig 300.

In this state, as illustrated in FIG. 6, when the inert gas compressed into the test flow field 310 is supplied using the test solution supply means 700, the test solution I flows to the opening of the test flow field 310 by the pressure of the inert gas.

At this time, if the airtightness line 40 of the separator 30 is in a normal state, the airtightness line 40 is in the state of accurately sealing the opening of the test flow field 310, such that even if a predetermined pressure is provided to the test solution I, the test solution I is not leaked to the outside of the test flow field 310.

However, as illustrated in FIG. 7, when the airtightness line 40 of the separator 30 is in an abnormal state, the airtightness line 40 does not maintain the state of accurately sealing the opening of the test flow field 310, such that the test solution I is leaked to the outside through the opening of the test flow field 310. When the test solution Io thus leaked to the outside is confirmed, a tester confirms a location at which the test solution Io is leaked to confirm the location of the airtightness line 40 in the abnormal state.

FIG. 8 is a diagram illustrating a cross section taken along the line A-A illustrated in FIG. 4, and although it has been illustrated that the lower jig 300, the separator 30, and the upper jig 400 are in a state of being spaced apart from each other in order to show the state of each component more clearly, it will be natural that the lower jig 300, the separator 30, and the upper jig 400 are in a state of being in close contact with each other in the state where the test is actually performed.

Meanwhile, the present disclosure may be implemented by changing the structure of the test flow field 310 formed on the lower jig 300 in order to identify the damaged location of the airtightness line 40 formed on the separator 30 more easily and clearly.

Figure 9:
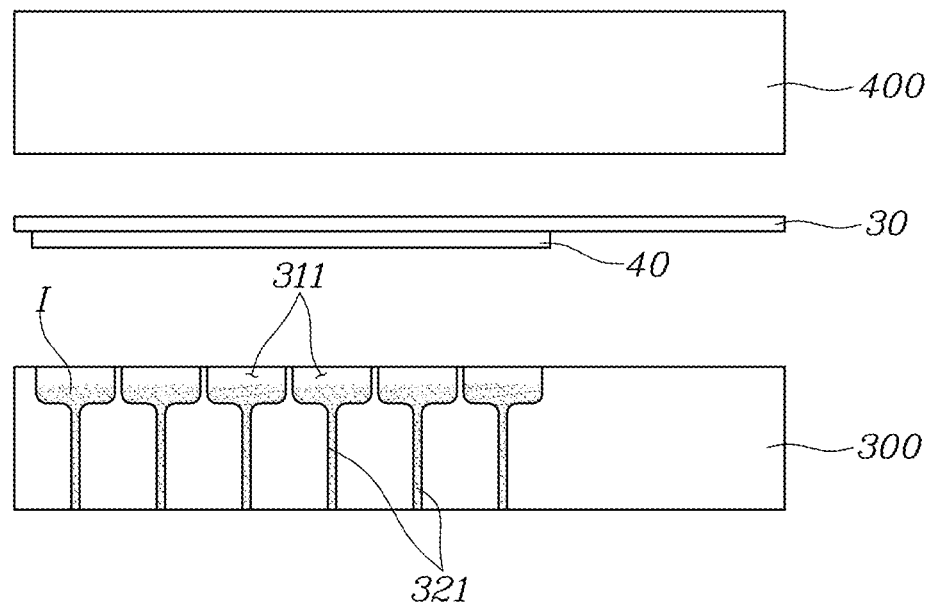
FIGS. 9 and 10 are diagrams illustrating a use state of an apparatus for testing the airtightness of a separator for the fuel cell according to another form of the present disclosure.
Figure 10:
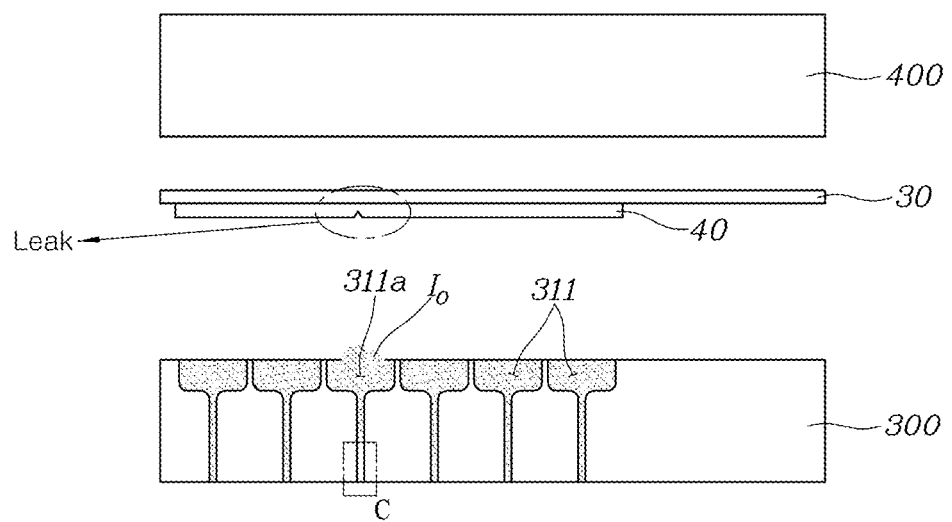

FIGS. 9 and 10 are diagrams illustrating use states of an apparatus for testing the airtightness of a separator for the fuel cell according to a modified example of the present disclosure.

As illustrated in FIGS. 9 and 10, in an apparatus for testing the airtightness of a separator for the fuel cell according to a modified example of the present disclosure, the test flow field 310 formed on the lower jig 300 is provided such that the test flow field is split by a predetermined length along the airtightness line 40 of the separator 30 into a plurality of test flow field sections, and the test solution independently flows to each test flow field section of the plurality of test flow field sections 311.

In addition, the test solution supply means 700 is provided to supply the test solution I to each test flow field section 311.

Even at this time, as described in the aforementioned exemplary form, the test flow field section 311 is filled with the test solution I having a predetermined volume, and the test solution supply means 700 may be implemented by the pump for supplying the pressed inert gas to each test flow field section 311.

Therefore, when the inert gas compressed into each test flow field 310 is provided using the test solution supply means 700, the test solution I flows to the opening of the test flow field 310 by the pressure of the inert gas.

As illustrated in FIG. 10, when there is a location at which the airtightness line 40 is damaged, the test solution is leaked to a test flow field 311a corresponding to the damaged location, and an empty space C is confirmed in the test flow field 310 by the amount of the leaked test solution. As described above, when the test flow field 310 in which the empty space C is formed is confirmed, it may be confirmed that the airtightness line 40 is damaged at the location where the corresponding test flow field 310 is formed. In addition, it is possible to confirm the location of the leaked test solution I together with the damaged airtightness line, thereby confirming the damaged location of the airtightness line 40 more accurately.

As in FIG. 8, although it has been illustrated in FIG. 10 that the lower jig 300, the separator 30, and the upper jig 400 are the state of being spaced apart from each other in order to show the state of each component more clearly, it will be natural that the lower jig 300, the separator 30, and the upper jig 400 are the state of being in close contact with each other in the state where the test is actually performed.

Meanwhile, the present disclosure may implement the jig unit differently from the aforementioned exemplary form for testing the airtightness line 40 formed on the upper surface of the separator 30.

Figure 11:
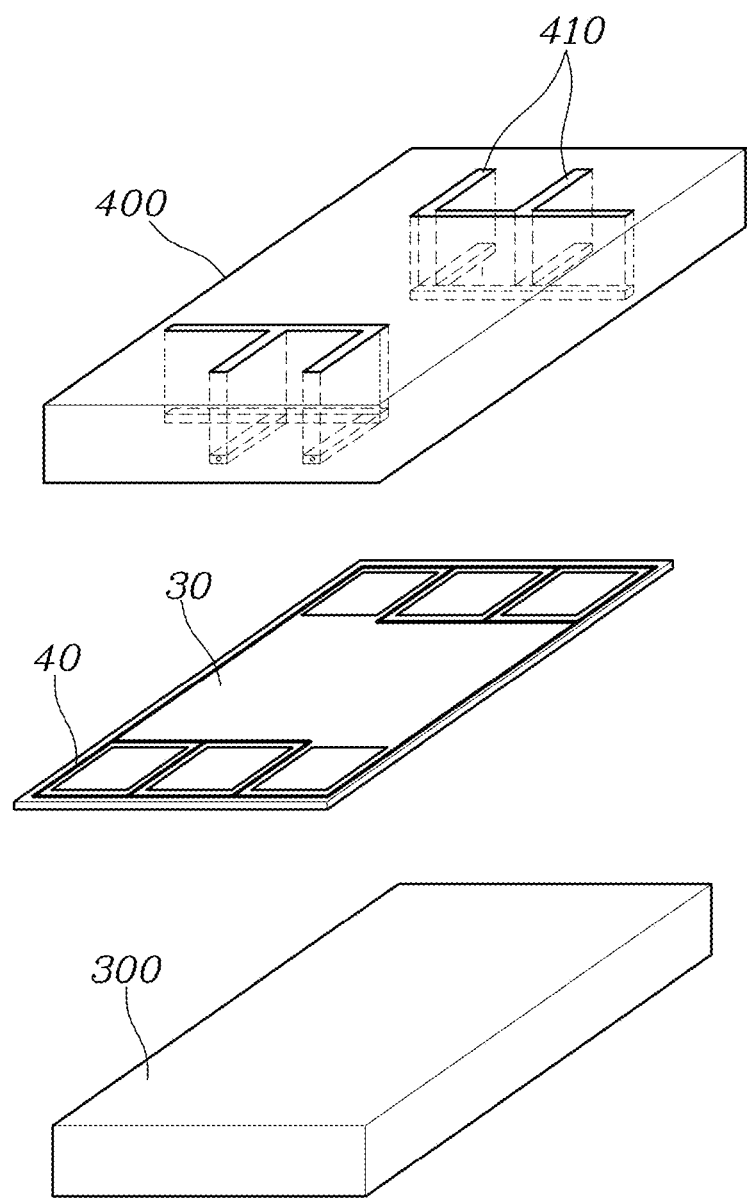
FIG. 11 is a perspective diagram illustrating main parts of an apparatus for testing the airtightness of a separator for the fuel cell according to another exemplary form of the present disclosure.
Figure 12:
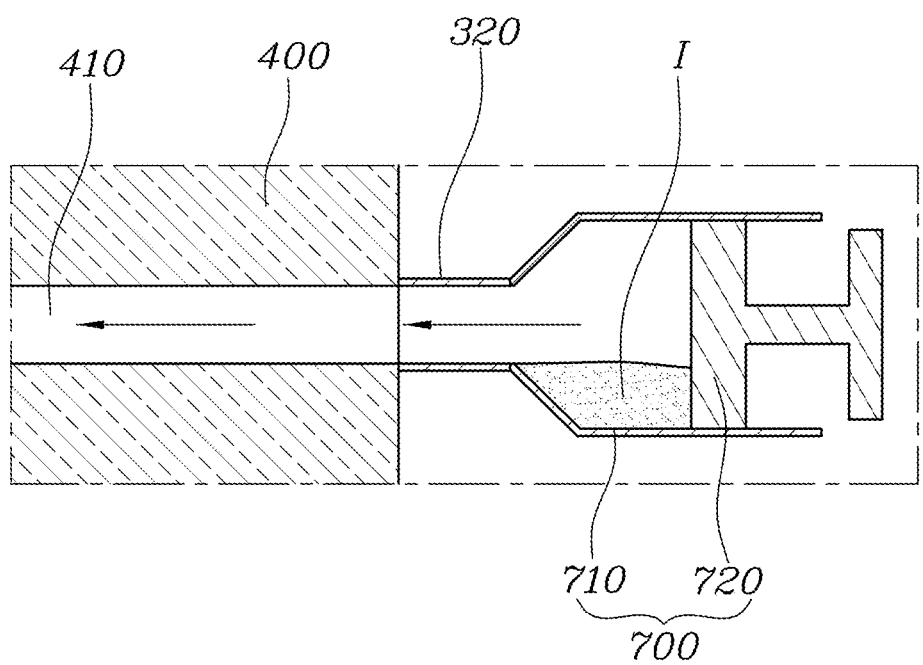
FIG. 12 is a perspective diagram illustrating main parts of an upper jig according to another exemplary form of the present disclosure.

FIG. 11 is a perspective diagram illustrating main parts of an apparatus for testing the airtightness of a separator for the fuel cell according to another exemplary form of the present disclosure, and FIG. 12 is a perspective diagram illustrating main parts of an upper jig according to another exemplary form of the present disclosure.

As illustrated in FIGS. 11 and 12, the apparatus for testing the airtightness of the separator for the fuel cell according to another exemplary form of the present disclosure, the jig unit 300, 400 is composed of the lower jig 300 having the separator seated on the upper surface thereof; and the upper jig 400 disposed on the lower jig 300 and pressing the separator 30 to bring the separator 30 into close contact with the lower jig 300, as described in the aforementioned exemplary form.

However, the present exemplary form, a test flow field 410 is formed on the upper jig 400.

For example, the test flow field 410 formed on the upper jig 400 is opened to the lower surface of the upper jig 400 for testing the airtightness line 40 formed on the upper surface of the separator 30.

In one form, the upper jig 400 is made of a transparent material to identify the test solution I supplied to the test flow field 310.

Meanwhile, as described in the aforementioned exemplary form, when the test solution I is filled in the test flow field 410 formed on the upper jig 400, the test solution I will be leaked through the test flow field 410 opened to the lower surface of the upper jig 400 by gravity as it is.

To prevent such a problem, in the present exemplary form, the test solution supply means 700 is implemented by being composed of a cylinder 710 installed to communicate with the test flow field 410 and filled with the test solution I having a predetermined volume; and a piston 720 provided inside the cylinder 710 to reciprocate, pressing the test solution I in the opening direction of the test flow field 410 by a forward motion, and recovering the test solution I into the cylinder 710 by a backward motion.

Therefore, the test solution I filed inside the cylinder 710 is supplied to the inside of the test flow field 410 upon the test of the airtightness line 40, and when the test is terminated, the test solution I is recovered into the cylinder 710 again.

A use state of the apparatus for testing the airtightness of the separator for the fuel cell according to another exemplary form of the present disclosure configured as described above will be described with reference to the drawings.

Figure 13:
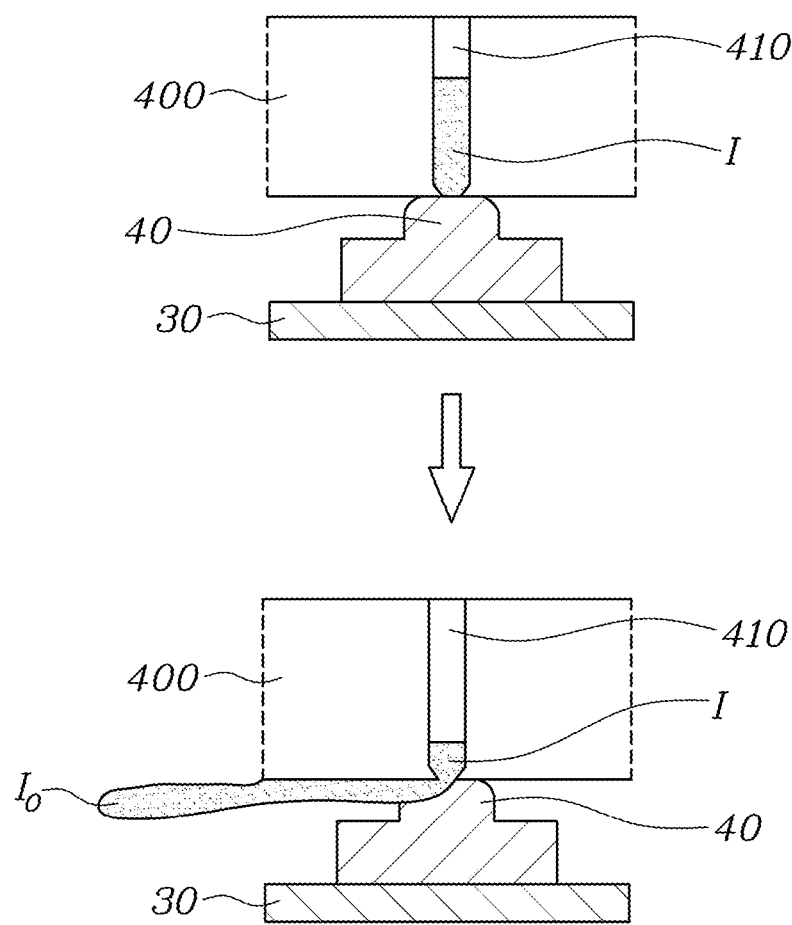
FIG. 13 is a diagram illustrating a use state of the apparatus for testing the airtightness of the separator for the fuel cell according to another exemplary form of the present disclosure.

FIG. 13 is a diagram illustrating a use state of the apparatus for testing the airtightness of the separator for a fuel cell according to another exemplary form of the present disclosure.

To test the airtightness line 40 formed on the separator 30, first, the upper jig 400 is in close contact with the upper surface of the separator 30. Then, the airtightness line 40 formed on the separator 30 is in a state of sealing an opening of the test flow field 410 formed on the upper jig 400.

In this state, as illustrated in FIG. 13, when the test solution I is supplied to the inside of the test flow field 410 using the test solution supply means 700, the test solution I flows to the opening of the test flow field 410 by a predetermined pressure by the gravity and the compression of the piston in the test solution supply means 700.

If the airtightness line 40 of the separator 30 is in a normal state, the airtightness line 40 is in a state of accurately sealing the opening of the test flow field 410, such that even if the predetermined pressure is provided to the test solution I, the test solution I is not leaked to the outside of the test flow field 410.

However, when the airtightness line 40 of the separator 30 is in an abnormal state, the airtightness line 40 does not maintain the state of accurately sealing the opening of the test flow field 410, such that the test solution I is leaked to the outside through the opening of the test flow field 410. As described above, when the test solution lo leaked to the outside is confirmed, the tester confirms a location at which the test solution lo is leaked to confirm a location of the airtightness line 40 in the abnormal state.

Meanwhile, although the exemplary form in which the test flow field is formed on the lower jig in order to test the airtightness line formed on the lower surface of the separator and the exemplary form in which the test flow field is formed on the upper jig in order to test the airtightness line formed on the upper surface of the separator have been separately described in the aforementioned exemplary forms, the test flow field may be formed on both the lower jig and the upper jig in order to simultaneously test the airtightness lines formed on the lower surface and upper surface of the separator.

While the present disclosure has been described with reference to the accompanying drawings and the aforementioned exemplary forms, the present disclosure is not limited thereto. Therefore, those skilled in the art may variously change and modify the present disclosure without departing from the technical spirit of the present disclosure.

What is claimed is:

1. An apparatus for testing airtightness of a separator for a fuel cell, the apparatus comprising:
   a jig unit being in close contact with a surface of the separator on which an airtightness line is formed, and having a test flow field formed thereon, the test flow field being opened to a location contacting the airtightness line of the separator; and
   a test solution supply means for supplying a test solution to a contact location at which the airtightness line of the separator and the jig unit contact to each other through the test flow field of the jig unit, such that a leakage of the test solution at the contact location is tested,
   wherein the jig unit comprises:
      a lower jig having the test flow field formed thereon, wherein the separator is seated on an upper surface of the lower jig; and
      an upper jig disposed on and configured to press the separator to form a close contact between the separator and the lower jig,
   wherein the test flow field of the lower jig is filled with the test solution having a predetermined volume, and the test solution supply means presses the test solution in an opening direction of the test flow field.

2. The apparatus according to claim 1,
   wherein the test flow field is split by a predetermined length along the airtightness line of the separator into a plurality of test flow field sections, and the test solution independently flows to each test flow field section of the plurality of test flow field sections by the test solution supply means.

3. The apparatus according to claim 1,
   wherein the jig unit is made of a transparent material, and wherein the test solution is a color liquid.

4. The apparatus according to claim 1, further comprising:
   a chamber for providing a test space;
   a press lower plate disposed on a bottom surface of the chamber, wherein a first surface of the jig unit is seated on the press lower plate;
   a press upper plate disposed on the jig unit, and configured to press a second surface of the jig unit; and
   a press movable shaft coupled to an upper portion of the press upper plate and configured to press and move the press upper plate toward the press lower plate, wherein the press lower plate, the jig unit and the press upper plate are arranged in the test space.

5. An apparatus for testing airtightness of a separator for a fuel cell, the apparatus comprising:
   a jig unit being in close contact with a surface of the separator on which an airtightness line is formed, and having a test flow field formed thereon, the test flow field being opened to a location contacting the airtightness line of the separator; and
   a test solution supply means for supplying a test solution to a contact location at which the airtightness line of the separator and the jig unit contact to each other through the test flow field of the jig unit, such that a leakage of the test solution at the contact location is tested,
   wherein the jig unit comprises:
      a lower jig having an upper surface on which the separator is seated; and
      an upper jig disposed on and configured to press the separator so as to form a close contact between the separator and the lower jig, wherein the test flow field is formed on a lower surface of the upper jig, and the test flow field is opened to the contact location, and
   wherein the test solution supply means comprises:
      a cylinder configured to fluidly communicate with the test flow field and filled with the test solution having a predetermined volume; and
      a piston provided inside the cylinder and configured to:
         reciprocate and press the test solution in an opening direction of the test flow field by a forward motion, and
         recover the test solution into the cylinder by a backward motion.

6. The apparatus according to claim 5,
   wherein the jig unit is made of a transparent material, and wherein the test solution is a color liquid.

7. The apparatus according to claim 5, further comprising:
   a chamber for providing a test space;
   a press lower plate disposed on a bottom surface of the chamber, wherein a first surface of the jig unit is seated on the press lower plate;
   a press upper plate disposed on the jig unit, and configured to press a second surface of the jig unit; and
   a press movable shaft coupled to an upper portion of the press upper plate and configured to press and move the press upper plate toward the press lower plate, wherein the press lower plate, the jig unit and the press upper plate are arranged in the test space.

* * * * *